United States Patent Office 3,093,683
Patented June 11, 1963

3,093,683
PROCESS FOR THE TRANSFORMATION OF BENZENE POLYCARBOXYLIC ACIDS TO TEREPHTHALIC ACID
Bernhard Raecke, Dusseldorf, Bruno Blaser, Dusseldorf-Urdenbach, Hubert Schirp, Dusseldorf, Werner Stein, Dusseldorf-Holthausen and Hartwig Schutt, Hagen/Westphalia, Germany, assignors to Henkel & Cie. G.m.b.H., Dusseldorf-Holthausen, Germany, a corporation of Germany
No Drawing. Filed Jan. 2, 1957, Ser. No. 632,030
Claims priority, application Germany Jan. 12, 1956
9 Claims. (Cl. 260—515)

This invention relates to the production of aromatic dicarboxylic and polycarboxylic acids from mixtures of aromatic carboxylic acids containing respectively three or more carboxyl groups on the aromatic nuclei and one or two carboxyl groups on the aromatic nuclei.

We have found that industrially useful aromatic dicarboxylic and polycarboxylic acids may be produced in a very simple procedure by heating alkali metal salts of aromatic carboxylic acids having three or more carboxyl groups in the molecule with alkali metal salts of aromatic monocarboxylic and dicarboxylic acids to temperatures above 300° C. and below the temperature at which substantial decomposition of the starting materials and reaction products takes place and thereafter converting the alkali metal salts so obtained into the corresponding free acids or various salts of such acids.

While the mechanics of the transformation reaction in accordance with the present invention are not fully understood, it is believed that the reaction involves an intramolecular or intermolecular migration of various alkali metal carboxyl groups. The resulting products are alkali metal salts of industrially valuable aromatic dicarboxylic and tricarboxylic acids, such as the di-alkali metal salt of terephthalic acid and the tri-alkali metal salt of trimesitinic acid, or mixtures of these alkali metal salts. For example, salts of carboxylic acids containing 3 to 6 carboxyl groups that are present in the mixture may be converted into salts of carboxylic acids of fewer carboxyl groups, particularly those containing 2 to 3 carboxyl groups, while salts of monocarboxylic acids or dicarboxylic acids present in the mixture are converted into salts of carboxylic acids having more carboxyl groups, especially 2 to 3 carboxyl groups. More advantageously, a mixture of salts of mono- and polycarboxylic acids is prepared in such a way that the number of carboxyl groups in the reaction mixture per aromatic ring system is approximately the same as in the carboxylic acid to be prepared. Thus, in preparing terephthalates from benzoates and salts of benzenetricarboxylic acids, the two salts are more advantageously used in equimolecular ratio, while, in reacting salts of hexacarboxylic acids with benzoates to form terephthalates, it is more advantageous to use 4 mols benzoate to 1 mol salt of hexacarboxylic acid.

Aromatic polycarboxylic acids which may be used as starting materials in the process are, for example, hemimellitic, trimellitic, trimesitinic, mellophanic, prehnitic, pyromellitic, benzenepentacarboxylic and mellitic acids or mixtures of such acids. They may be prepared by known processes such as, for example, by oxidation of alkylbenzenes or by oxidative degradation of higher, and possibly alkylated ring systems or from carbonaceous substances, such as graphite, anthracite coal, soft coal, peat, wood, lignin, coal extracts, tars, pitches, asphalts, coke, petroleum residues, and their transformation products, for example, by treatment with nitric acid or with oxygen and alkalies. Other starting materials for the process of this invention are those carboxylic acids which are derived from polycyclic acid, especially bicyclic aromatic ring systems, such as diphenyltricarboxylic acid-2,3,4', naphthalene-tricarboxylic acid-1,4,5, diphenyl-tetracarboxylic acid-2,3,5,6 and -3,4,3',4', naphthalenetetracarboxylic acid-1,4,5,8 and the like.

The aromatic mono- and dicarboxylic acids which may be used as starting materials in the process are, for example, benzoic acid, α- and β-naphthoic acid, dipenyl-monocarboxylic acid, phthalic acid, isophthalic acid, naphthalic acid, diphenic acid, and other mono- and dicarboxylic acids which are derived from aromatic ring systems.

An advantageous embodiment of the process according this invention consists of using mixtures of carboxylic acids as starting materials which contain on the average about an equal number of carboxyl groups per aromatic ring system as the number of carboxyl groups in the carboxylic acid to be produced; for example, mixtures of benzoic acid and benzenepolycarboxylic acids which contain on the average two carboxyl groups per benzene ring produced good yields of terephthalic acid upon being subjected to the treatment herein described.

The above-named carboxylic acids or their mixtures are used in the form of their alkali metal salts, which can be produced in accordance with known methods, for example, by reaction in solution or by melting the acids of their anhydrides together with metal carbonates, oxalates and hydroxides. Especially suitable are the potassium salts. The salts of lithium, rubidium and cesium are less important for reasons of economy. The sodium salts are also suitable. It is often advantageous to employ mixtures of sodium and potassium salts, because the mechanical properties and handling of the reaction mixture are improved thereby. In some cases it is advantageous to use the acid alkali metal salts of the aromatic polycarboxylic acids as the starting material in place of the neutral alkali metal salts.

It is not necessary that the starting material contain the finished alkali metal salts of aromatic carboxylic acids. Equally suitable are reaction mixtures which, under the conditions of the reaction, produce the alkali metal salts in situ. For example, we have found that the desired results are also produced by heating mixtures of aromatic carboxylic anhydrides or esters and suitable alkali metal salts, especially alkali metal carbonates, under the conditions above set forth. Such mixtures need not contain the alkali metal salt-forming components in exact stoichiometric proportions; one or the other component may be present in excess.

The best results are obtained if the starting material is provided in a thoroughly dry state. If the alkali metal salts of the aromatic carboxylic acids serving as the starting materials are produced, for example, by neutralizing aqueous solutions of the carboxylic acids with alkali metal hydroxide, the dissolved alkali metal salts formed thereby may be transformed into dry powders by any suitable drying process, for instance by spray drying, drum-drying and the like. If necessary, the substantially dry powder may then be subjected to a further drying procedure just prior to its use in the present process, especially if the powder has been stored, in order to remove small residual amounts of moisture.

We have further found that the reaction according to the present invention is favorably influenced by the presence of catalysts. Metal and their compounds in general have proved to be suitable catalysts especially zinc, cadmium, mercury, iron, lead, manganese and cesium and their compounds, such as their oxides, inorganic or organic acid salts, complexes and metalorganic compounds. More particularly, the carbonates, bicarbonates, halides, sulfates, phosphates, acetates, formates, oxalates, fatty acid salts or salts of the aromatic carboxylic acids used as the starting material in the reaction, for example, the benzoates, terephthalates, trimesitinates, etc., derived from these metals are examples of suitable catalysts. The amount of catalyst added to the starting material to produce the desired catalytic effect may vary within rather wide limits, namely from 0 to 15% by weight, but preferably from 0.5 to 5% by weight, based on the weight of starting material. Most advantageously, the catalyst is provided in a finely divided state and uniformly distributed throughout the starting material, which may, for example, be accomplished by dissolving or suspending the catalyst in an aqueous solution of the salts serving as the starting material and thereafter spray-drying, drum-drying or otherwise evaporating the suspension or solution to produce a dry, finely divided, homogeneous powder. However, the catalyst may also be added to the starting material in conjunction with well-known carrier substances, such as kieselguhr.

In addition to catalysts, the reaction mixture may also comprise inert liquid or solid additives. For example, the reaction in accordance with the present invention may be carried out in the presence of sand, metal powders, metal shavings, kieselguhr, activated charcoal and inert salts such as potassium carbonate, sodium carbonate, or sodium sulfate. The addition of such inert materials in many cases improves the physical properties of the reaction mixture. In place of the inert solids, inert liquids may also be present during the rearrangement reaction, provided such liquids do not decompose under the conditions of elevated temperature and pressure. Such suitable inert liquids are, for example, diphenyloxide, diphenyl, benzene, naphthalene and the like.

The rearrangement reaction according to the present invention takes place upon heating the starting material to temperatures above 300° C. up to the temperature at which the salts of the aromatic carboxylic acids and the reaction products begin to decompose, but below the temperature of substantial decomposition, most advantageously by heating the starting material to between 340° C. and 450° C. At temperatures above 500° C. the starting material as well as the reaction products decompose to an excessive extent, so that the yields are substantially reduced. Consequently, it is not advantageous to carry out the reaction at such extremely elevated temperatures.

In order to avoid local overheating and sintering of the reaction mixture it is advantageous to agitate the starting materials, for example by heating the reaction mixture in autoclaves provided with a stirring device, in rotary autoclaves, in rotary furnaces or in fluidized bed systems. Similarly, adequate uniform heat distribution may be provided by distributing the reaction mixture in thin layers, either in conjunction with or without agitation. However, good yields are also obtained without the application of any of these measures, as long as means are provided to prevent local overheating.

The best results are obtained if oxygen is substantially excluded from the reaction space during the rearrangement reaction according to the present invention. For this purpose it is advantageous to heat the starting material in the presence of inert gases such as carbon dioxide, nitrogen, methane, benzene, carbon monoxide and the like. Particularly good yields are obtained if the rearrangement reaction above described is carried out in an atmosphere of carbon dioxide under pressure. However, elevated pressures are not essential to satisfactory yields; the rearrangement reaction will also proceed at subatmospheric and atmospheric pressures.

The various dicarboxylic and polycarboxylic acid alkali metal salts formed by the rearrangement reaction may be separated from each other, from untransformed starting material and from the catalyst by a number of known methods. For example, a very suitable method comprises dissolving the reaction product mixture in water, filtering off insoluble components, precipitating the acids or their acid alkali metal salts by acidifying the filtrate with acid agents such as sulfuric acid, hydrochloric acid, carbon dioxide or organic acids, including the aromatic carboxylic acids used as the starting materials for the reaction, and separating the precipitated acids or acid salts from each other, for example by extraction with hot water. Any untransformed starting materials may readily be recovered from the aqueous solution and may be reused as starting materials for subsequent rearrangement reactions. The free acids or their alkali metal salts may, if desired, be transformed into their derivatives such as their methyl esters by methods well known in chemical industry.

When the alkali metal salts of polycarboxylic acids are heated together with alkali metal salts of benzoic acid a substantial technical advantage is realized, as the added benzoic acid can practically be completely converted into terephthalic acid, and substantially no formation of benzene occurs.

The following examples will further illustrate our invention and enable persons skilled in the art to understand the invention more completely. It is understood, however, that our invention is not limited to these particular examples.

*Example 1*

15 parts of an equimolar mixture of potassium benzoate and the tripotassium salt of hemimellitic acid, in admixture with 0.75 part of cadmium oxide were heated for five minutes at 450° C. in a glass vessel on an aluminum block (the temperature was measured in the aluminum block). During the run carbon dioxide was passed over the reaction mixture. After cooling the reaction product was boiled with water and the solution after filtration was treated while still hot, with hydrochloric acid. The precipitated terephthalic acid was separated from the hot solution and was repeatedly washed with hot water and dried at 130° C. The yield of terephthalic acid was 7.05 parts. The terephthalic acid had an acid number of 673 and the dimethyl ester of terephthalic acid obtained by way of terephthalic acid dichloride melted at 140° C.

*Example 2*

A mixture of 2.5 parts potassium benzoate, 5 parts tripotassium salt of hemimellitic acid, 7.5 parts dipotassium phthalate (molar ratio 1:1:2) and 1.0 part cadmium benzoate were heated for five minutes at 450° C. in a stream of carbon dioxide, as described in Example 1. The reaction product was then worked up in the manner described in that example and yielded 7 parts terephthalic acid.

*Example 3*

A mixture of 5 parts potassium benzoate and 10 parts of the tripotassium salt of trimellitic acid (molar ratio 1:1) and 0.75 part cadmium carbonate was heated for an hour and a half at 450° C. as described in Example 1. Upon working up the reaction product in the above-described manner, 5.7 parts terephthalic acid were obtained.

*Example 4*

A mixture of 22.9 parts of the potassium salt of hemimellitic acid, 17.1 parts dipotassium isophthalate and 2 parts cadmium terephthalate was heated for five hours at 420° C. in a rotary autoclave. Carbon dioxide was introduced into the autoclave to an initial pressure of 50 atmospheres and the final pressure was 175 atmospheres. Upon working up the raw product, amounting to 38 parts by weight, in the above-described manner, 16.5 parts terephthalic acid were obtained.

*Example 5*

40 gm. of a mixture consisting of potassium benzoate and the tetrapotassium salt of pyromellitic acid in a molar ratio of 2:1, together with 1.3 gm. cadmium fluoride, were heated for two hours at 410° C. in a shaking autoclave having a volume of 0.2 liter. At the beginning of the run, 45 atmospheres of carbon dioxide were introduced; at 410° C. the pressure rose to 125 atmospheres. The raw product obtained thereby in an amount of 36 gm. was dissolved in water, filtered, and precipitated with mineral acid to yield 16.2 gm. terephthalic acid. 1.2 gm. pyromellitic acid were recovered from the mother liquor.

Example 6

A mixture of 11.8 gm. of the tetrapotassium salt of mellophanic acid and 9.3 gm. potassium benzoate (corresponding to a molar ratio of 1:2), together with 0.6 gm. cadmium fluoride, were heated for two hours at 420° C. in a shaking autoclave having a volume of 0.2 liter. At the beginning of the run, carbon dioxide was introduced to a pressure of 50 atmospheres and the final pressure at 420° C. was 150 atmospheres. The product thus obtained in an amount of 19.0 gm. was worked up in the above-described manner and yielded 9.3 gm. terephthalic acid.

Example 7

The starting mixture was a mixture of benzenepolycarboxylic acids, obtained from oxidation products of coal, which contained 39% tricarboxylic acids and 61% tetracarboxylic acids. This mixture was neutralized with potassium hydroxide, and potassium benzoate was added to the aqueous solution of the potassium salts in such a manner that the mixture contained two carboxyl groups per benzene nucleus. The aqueous solution was evaporated and the residue was dried at 150° C. and then admixed with 3% cadmium fluoride. 40 gm. of this mixture were heated for one-half hour at 430° C. in a rotary autoclave having a volume of 0.2 liter. At the beginning of the run, carbon dioxide was introduced to a pressure of 40 atmospheres, and at 430° C. the maximum pressure was 144 atmospheres. The reaction product obtained thereby in an amount of 33.9 gm. was worked up in the above-described manner and yielded 14.4 gm. terephthalic acid. Heating an equal quantity of the starting material for one-half hour at 420° C. and under a carbon dioxide pressure of 20 atmospheres yielded 11.0 gm. terephthalic acid.

Example 8

12.5 gm. pyromellitic acid obtained by oxidation of coal were neutralized with potassium hydroxide, and the tetrapotassium salt produced thereby was admixed with potassium benzoate in a molar ratio of 1:2. Thereafter 0.75 gm. cadmium benzoate was added to this mixture and the dried mixture was heated for one-half hour at 430° C. At the beginning of the run, carbon dioxide was introduced to a pressure of 50 atmospheres, and at 430° C. the pressure reached 116 atmospheres. The reaction product, which weighed 32.9 gm., yielded 13.6 gm. terephthalic acid. 3.70 gm. pyromellitic acid were recovered from the mother liquor of the terephthalic acid precipitation.

Example 9

27.0 gm. of the pentapotassium salt of benzenepentacarboxylic acid, obtained by oxidation of 9-acetyl-octahydro-anthracene, were finely milled with 26.5 gm. potassium benzoate (molar ratio 1:3) and 1.6 gm. cadmium fluoride, and the resulting mixture was heated for one-half hour at 440° C. in a rotary autoclave. At the beginning of the run, carbon dioxide was introduced to a pressure of 50 atmospheres; in the course of the reaction, the pressure rose to 160 atmospheres. After cooling in an atmosphere of carbon dioxide and working up the reaction product as previously described, 25.0 gm. terephthalic acid were obtained.

Example 10

25.4 gm. of the hexapotassium salt of mellitic acid obtained by oxidation of dodecahydrotriphenylene, were finely milled, together with 28.6 gm. potassium benzoate (molar ratio 1:4) and 1.6 gm. cadmium fluoride, and the resulting mixture was heated for three hours at 440° C. in a rotary autoclave. At the beginning of the run, carbon dioxide was introduced into the autoclave to a pressure of 60 atmospheres. Upon working up the reaction product as previously described, 22.3 gm. terephthalic acid were obtained.

Example 11

A mixture of 10.0 gm. tripotassium-trimesitinate, 5.0 gm. potassium benzoate, 30.0 gm. anhydrous potassium carbonate and 3.0 gm. cadmium fluoride was placed into a rotary autoclave having a volume of 200 cc. Thereafter, 50 atmospheres nitrogen were introduced and the autoclave was heated for 3 hours at 420° C. The pressure rose to 160 atmospheres. After cooling and releasing the pressure, the reaction mixture was dissolved in 500 cc. water and the solution was filtered. The filtrate was acidified with hydrochloric acid at the boiling point. The precipitated terephthalic acid was filtered off while still hot and was washed with hot water. The yield was 5.1 gm.

Example 12

A mixture of 10.0 gm. tripotassium-trimesitinate, 5.0 gm. potassium benzoate and 30.0 gm. potassium carbonate was heated in a rotary autoclave having a volume of 200 cc. in a carbon dioxide atmosphere, under exclusion of oxygen from the air, to a temperature exceeding the critical temperature of carbon dioxide. Subsequently, 50 atmospheres carbon dioxide were introduced and the system was heated for 5 hours at 420° C. The pressure rose to 149 atmospheres. The reaction product was worked up in the manner described in Example 11. 1.8 gm. of terephthalic acid were obtained.

Example 13

A mixture of 10.0 gm. tripotassium-trimesitinate, 5.0 gm. potassium benzoate, 30.0 gm. potassium carbonate and 3.0 gm. anhydrous zinc fluoride was heated as described in Example 12 in a carbon dioxide atmosphere under pressure for 5 hours at 420° C. Upon working up the reaction mixture, 4.1 gm. terephthalic acid were obtained.

Example 14

A mixture of 4.9 gm. of the pentapotassium salt of benzene pentacarboxylic acid, 4.8 gm. potassium benzoate, 30.0 gm. anhydrous potassium carbonate and 5.0 gm. anhydrous zinc fluoride was placed into a rotary autoclave having a volume of 200 cc. and thereafter heated for 3 hours at 420° C. under an initial carbon dioxide pressure of 50 atmospheres. The pressure rose to a maximum of 140 atmospheres. Upon working up the reaction product in the customary manner, 4.7 gm. terephthalic acid were obtained.

Example 15

A mixture of 10.0 gm. tripotassium-trimesitinate, 4.0 gm. lithium benzoate, 30.0 gm. anhydrous potassium carbonate and 3.0 gm. cadmium fluoride was heated in a rotary autoclave having a volume of 200 cc. for 5 hours at 420° C. in a carbon dioxide atmosphere at an initial pressure of 50 atmospheres, in the same manner as described in Example 12. The reaction product was worked up in the usual manner and yielded 5.7 gm. terephthalic acid.

Example 16

A mixture of 10.0 gm. tripotassium-trimesitinate, 4.5 gm. sodium benzoate, 30.0 gm. potassium carbonate and 3.0 gm. cadmium fluoride was placed into a rotary autoclave having a volume of 200 cc. Subsequently, 50 atmospheres carbon dioxide were introduced at a temperature above the critical temperature of the gas and the autoclave was heated for 5 hours at 420° C. The reaction mixture was worked up in the manner described above. 4.1 gm. terephthalic acid were obtained.

*Example 17*

A mixture of 10.0 gm. of the tripotassium salt of trimesitinic acid, 4.5 gm. sodium benzoate, 30.0 gm. anhydrous sodium carbonate and 3.0 gm. cadmium fluoride was placed into a rotary autoclave having a volume of 200 cc. Subsequently, 50 atmospheres carbon dioxide were introduced into the autoclave above the critical temperature of the gas. The reaction mixture was heated for 5 hours at 420° C., whereby a maximum pressure of 170 atmospheres was reached. Upon working up the reaction mixture in the usual fashion, 0.6 gm. terephthalic acid were obtained.

When the lithium, cesium and rubidium salts of aromatic, polycarboxylic and monocarboxylic acids are substituted for the potassium and sodium salts in the above examples the same reaction takes place with slightly varying yields depending upon the conditions of the reaction.

While we have disclosed certain specific embodiments of our invention, it will be apparent to persons skilled in the art that the invention is not limited to these embodiments and that various changes and modifications may be made without departing from the spirit of the invention or the scope of the appended claims.

We claim:

1. The process of producing terephthalic acid from benezene polycarboxylic acids, other than terephthalic acid, which comprises heating a mixture of an alkali metal salt of benzene polycarboxylic acid with from 3 to 6 carboxyl groups in the molecule and an alkali metal salt of a benzene carboxyl acid, other than terephthalic acid, with from 1 to 2 carboxyl groups in the molecule to a temperature between 300° C. and the decomposition temperature of said starting materials and reaction products in the substantially oxygen-free atmosphere of an inert gas until a substantial amount of an alkali metal salt of terephthalic acid has been formed, converting the alkali metal salt of terephthalic acid into terephthalic acid and separating said terephthalic acid from the reaction mass.

2. The process according to claim 1 in which the number of carboxyl groups in the mixture are at least equal to two carboxyl groups present in the reaction mixture for each benzene nucleus present.

3. The process according to claim 1, wherein the inert gas is carbon dioxide.

4. The process according to claim 1, wherein the inert gas is nitrogen.

5. The process according to claim 1, wherein the inert gas is carbon dioxide and the heating is under superatmospheric pressures.

6. The process of producing terephthalic acid from benzoic acid which comprises heating an alkali metal salt of benzoic acid to a temperature between about 300° C. and the decomposition temperature of the starting materials and reaction products in a substantially oxygen-free atmosphere of an inert gas, in the presence of an alkali metal salt of a benzene polycarboxylic acid with from 3 to 6 carboxyl groups in the molecule until a substantial amount of an alkali metal salt of terephthalic acid has been formed, acidifying the reaction mass to obtain free terephthalic acid, and separating the terephthalic acid from the reaction mixture.

7. The process of producing terephthalic acid from benzene polycarboxylic acids other than terephthalic acid and benzoic acid which comprises heating an alkali metal salt of benzene polycarboxylic acid with from three to six carboxyl groups in the molecule, and an alkali metal salt of benzoic acid in molecular ratio to provide two carboxyl groups per aromatic ring to a temperature between 300° C. and the decomposition temperature of the said starting materials and reaction products in the substantially oxygen-free atmosphere of an inert gas until a substantial amount of an alkali metal salt of terephthalic acid has been formed, converting the alkali metal salt of terephthalic acid into terephthalic acid and separating said terephthalic acid from the reaction mass.

8. The process of producing terephthalic acid from benzene polycarboxylic acids other than terephthalic acid, and benzoic acid which comprises heating a potassium salt of benzene polycarboxylic acid with at least three carboxylic groups in the molecule, and a potassium salt of benzoic acid in molecular ratio to provide two carboxyl groups per aromatic ring, to a temperature between 300° C. and the decomposition temperature of the said starting materials and reaction products in the substantially oxygen-free atmosphere of an inert gas until a substantial amount of an alkali metal salt of terephthalic acid has been formed, converting the alkali metal salt of terephthalic acid into terephthalic acid and separating said terephthalic acid from the reaction mass.

9. The process of producing terephthalic acid which comprises heating a mixture of an alkali metal salt of trimellitic acid and an alkali metal salt of benzoic acid to a temperature between about 350° C. and the decomposition temperature of the reaction mixture in an inert atmosphere and acidifying the alkali metal terephthalate produced thereby to form terephthalic acid.

References Cited in the file of this patent

FOREIGN PATENTS

| | | |
|---|---|---|
| 522,829 | Belgium | Oct. 15, 1953 |
| 524,035 | Belgium | Nov. 30, 1953 |